(12) United States Patent
Dawson et al.

(10) Patent No.: US 8,214,751 B2
(45) Date of Patent: Jul. 3, 2012

(54) DYNAMIC SPAWNING OF FOCAL POINT OBJECTS WITHIN A VIRTUAL UNIVERSE SYSTEM

(75) Inventors: Christopher J. Dawson, Arlington, VA (US); Rick A. Hamilton, II, Charlottesville, VA (US); Paul A. Moskowitz, Yorktown Heights, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 12/103,525

(22) Filed: Apr. 15, 2008

(65) Prior Publication Data

US 2009/0259946 A1    Oct. 15, 2009

(51) Int. Cl.
*G06F 3/00* (2006.01)

(52) U.S. Cl. ....................................................... 715/757

(58) Field of Classification Search .................. 715/757, 715/747, 751, 753, 706, 849
See application file for complete search history.

(56) References Cited

U.S. PATENT DOCUMENTS

| | | | |
|---|---|---|---|
| 5,879,236 A | | 3/1999 | Lambright |
| 5,884,029 A | * | 3/1999 | Brush et al. .................. 709/202 |
| 6,023,270 A | | 2/2000 | Brush et al. |
| 6,154,658 A | | 11/2000 | Caci |
| 6,226,669 B1 | * | 5/2001 | Huang et al. .................. 709/204 |
| 6,532,007 B1 | | 3/2003 | Matsuda |
| 6,570,563 B1 | | 5/2003 | Honda |
| 6,753,857 B1 | * | 6/2004 | Matsuura et al. ............. 345/419 |
| 6,767,287 B1 | | 7/2004 | Mcquaid et al. |
| 6,981,220 B2 | | 12/2005 | Matsuda |
| 2002/0095463 A1 | * | 7/2002 | Matsuda ........................ 709/205 |
| 2003/0156135 A1 | | 8/2003 | Lucarelli |
| 2005/0015725 A1 | * | 1/2005 | Matsuda ........................ 715/706 |
| 2005/0216346 A1 | | 9/2005 | Kusumoto et al. |
| 2006/0025216 A1 | | 2/2006 | Smith |
| 2006/0111188 A1 | | 5/2006 | Winkler |
| 2006/0241859 A1 | | 10/2006 | Kimchi et al. |
| 2007/0050716 A1 | | 3/2007 | Leahy et al. |
| 2007/0168359 A1 | | 7/2007 | Jacob et al. |
| 2007/0250901 A1 | * | 10/2007 | McIntire et al. .............. 725/146 |
| 2008/0059283 A1 | | 3/2008 | Hansen et al. |
| 2008/0309671 A1 | | 12/2008 | Shuster et al. |
| 2009/0063983 A1 | * | 3/2009 | Amidon et al. ............... 715/733 |
| 2009/0150418 A1 | | 6/2009 | Shuster |
| 2009/0259539 A1 | * | 10/2009 | Dawson et al. .................. 705/14 |
| 2010/0018382 A1 | | 1/2010 | Feeney et al. |

OTHER PUBLICATIONS

"US Appl. No. 12/103,472 Final Office Action", Feb. 10, 2011, 46 pages.
"US Appl. No. 12/103,472 Office Action", Aug. 5, 2010, 28 pages.

* cited by examiner

*Primary Examiner* — Thanh Vu
(74) *Attorney, Agent, or Firm* — DeLizio Gilliam, PLLC

(57) ABSTRACT

In various embodiments, the density of a plurality of virtual universe avatars within a predetermined proximity from a designated focal point object in a virtual universe is determined. One or more auxiliary focal point objects associated with the designated focal point object are dynamically spawned within the virtual universe based on the determined density of the virtual universe avatars. Dynamic spawning of auxiliary focal point objects can reduce the load on virtual universe host servers and the corresponding client devices, and thus may improve performance of the virtual universe system.

18 Claims, 9 Drawing Sheets

Region 1

Region 2

Region 3

Region 1

DYNAMIC SPAWNING OF FOCAL POINT OBJECTS WITHIN A VIRTUAL UNIVERSE SYSTEM

BACKGROUND

Embodiments of the inventive subject matter generally relate to the field of virtual universe systems, and, more particularly, to dynamic spawning virtual universe systems.

Virtual universe applications allow people to socialize and interact in a virtual universe. A virtual universe ("VU") is a computer-based simulated environment intended for its residents to traverse, inhabit, and interact through the use of avatars. Many VUs are represented using 3-D graphics and landscapes, and are populated by many thousands of users, known as "residents." Other terms for VUs include metaverses and "3D Internet."

SUMMARY

Various embodiments are disclosed of a method and apparatus for dynamically spawning auxiliary focal point objects within a virtual universe. According to one embodiment, the density of a plurality of avatars within a predetermined proximity from a designated focal point object in a virtual universe is determined. The designated focal point object is associated with transmissions of information within the virtual universe. One or more auxiliary focal point objects are dynamically spawned within the virtual universe based on the determined density of the avatars. The one or more auxiliary focal point objects are associated with the designated focal point object.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, examples refer to avatars comprising virtual universe receiver objects having embedded software for interpreting and processing transmissions of information in a virtual universe, but in other embodiments the avatars may interpret and process the transmissions without the virtual universe receiver objects. In other instances, well-known instruction instances, protocols, structures and techniques have not been shown in detail in order not to obfuscate the description.

In various embodiments, the proximity of an avatar with respect to a designated focal point object within a virtual universe is determined, and information associated with the designated focal point object is identified. A first of a plurality of representations of the information is selected based, at least in part, on the determined proximity of the avatar with respect to the designated focal point object. The first representation of the information is then transmitted to the avatar. Proximity-based transmission of information disseminates relevant information to avatars. Virtual universe businesses can use proximity-based transmission of information to encourage avatars to move near the designated focal point object within the virtual universe so that the avatars can be exposed to products and advertisements. Additionally, in some embodiments, multiple broadcasts of information can be provided to the avatars via one or more virtual universe transmitters. In these embodiments, avatars can select one or more of the available broadcasts and can switch between broadcasts as desired. Furthermore, in some embodiments, the density of a plurality of avatars within a predetermined proximity from a designated focal point object in the virtual universe is determined. One or more auxiliary focal point objects associated with the designated focal point object are dynamically spawned within the virtual universe based on the determined density of the virtual universe avatars. Dynamic spawning of auxiliary focal point objects reduces the load on virtual universe host servers and the corresponding client devices, and thus improves performance of the virtual universe system.

Figure 1A:
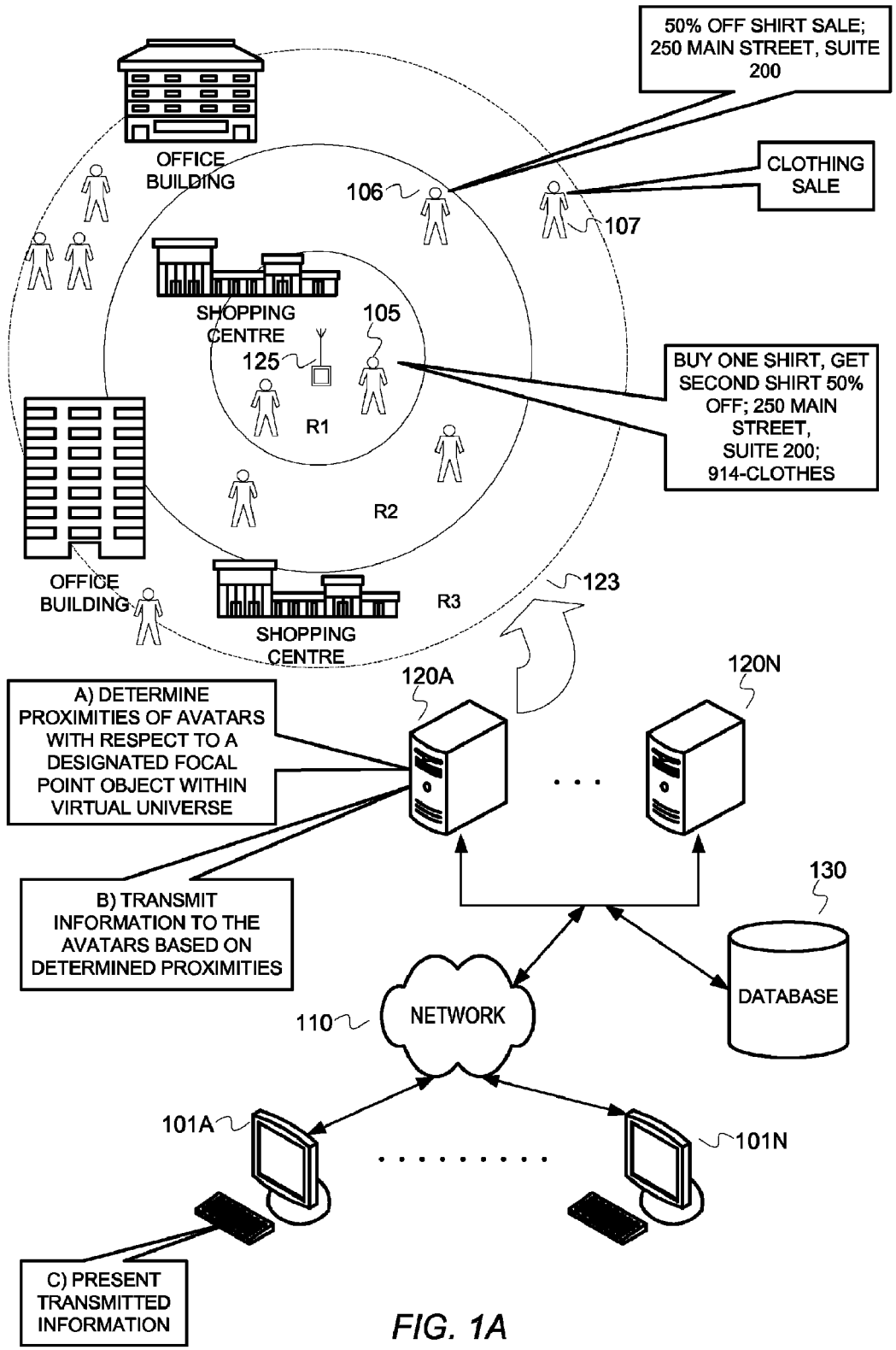
FIG. 1A conceptually depicts an example virtual universe system that transmits information to avatars based on the proximities of the avatars with respect to a designated focal point object within the virtual universe.

FIG. 1A conceptually depicts an example virtual universe system that transmits information to avatars based on the proximities of the avatars with respect to a designated focal point object within the virtual universe. The system includes a plurality of client computers 101A-N (hereinafter "client computers 101"), a network 110 (e.g. the Internet), a plurality of virtual universe servers 120A-N (hereinafter "virtual universe servers 120"), and a virtual universe database 130. A user of client computer 101A can access the virtual universe via the network 110 to perform activities in the virtual universe environment with an avatar 105. The user or "resident" of the virtual universe may be a person, group of people, or organization that controls at least one avatar and may own virtual land within the virtual universe. The user may use the avatar to traverse various regions within the virtual universe, inhabit a region, and interact with the environment and other avatars for social or business purposes, e.g., chat with other avatars at a virtual universe coffee shop or buy virtual clothing at a virtual universe shopping center. A virtual universe region is defined as a virtual area (e.g., land, air, and/or water) within the virtual universe, typically supported by one or more virtual universe servers. In the example illustrated with FIG. 1A, each virtual universe server 120 may host one or more regions. Avatars can move within regions by walking, swimming, or flying, and across regions by teleporting from one region to another. It is noted, however, that avatars can move in many different ways (e.g., teleporting within regions, running, gliding, etc.).

A perspective 123 of the virtual universe rendered at the client 101A depicts the avatar 105 in a shopping area of a city region hosted by virtual universe server 120A. At a stage A, virtual universe server 120A determines the proximities of the avatars with respect to a designated focal point object 125 within the virtual universe. For example, virtual universe server 120A may detect that avatar 105 is a virtual distance X (e.g., 35 virtual feet) away from the designated focal point object 125, which is within an area R1 (e.g., an area with a radius of 50 virtual feet). At a stage B, virtual universe server 120A transmits information to the avatars based on the determined proximities. For instance, virtual universe server 120A may determine the content level and/or content type associated with the transmission based on the detected proximities. In the example shown in FIG. 1A, a transmission of an advertisement for a virtual clothing sale at one of the virtual universe shopping centers is provided to the avatars. In this example, a greater content level with respect to the advertisement is received by avatars within area R1, compared to avatars within area R2 and beyond. At a stage C, the transmitted advertisement information is presented to the users controlling avatars, e.g., the user controlling avatar 105 at the client 101A. For example, the advertisement information may be generated next to the avatar 105 on the user's display and/or audio may be played out to the user.

The virtual universe can include a plurality of designated focal point objects 125. In various implementations, the focal point objects 125 may serve as reference points for determining the proximity measurements with respect to the avatars. The focal point objects 125 may also serve as virtual universe transmitters for transmitting the information to the avatars. In other implementations, the designated focal point objects 125 may only be used as reference points for determining the proximity measurements. In these implementations, the virtual universe server 120 can transmit the information to the avatars by other mechanisms, e.g., via other virtual universe objects, such as broadcast towers or buildings.

One or more virtual universe transmitters (e.g., the designated focal point object 125 and/or other virtual universe objects) can transmit information to all the avatars within the virtual universe. It is noted, however, that in other implementations the virtual universe transmitter may transmit information only to avatars that are located within a predetermined virtual distance from the designated focal point object 125. In both cases, the content level and/or content type associated with the transmission may be based on the detected proximities of the avatars to a designated focal point object 125.

The information transmitted to the avatars may be one or more of news, music, advertisements, multimedia, video feeds, financial information, and entertainment information, among others. In one specific example, virtual universe businesses (e.g., virtual car dealership) or other entities may lease the virtual universe transmitter (e.g., certain time slots) from the virtual universe administrator for transmitting advertisements, coupons, and product information to avatars. Proximity-based transmission of information can encourage avatars to move near the designated focal point object 125, which may be placed at or near the virtual universe business. This may lead to increased visits to the store, product exposure, and business transactions. Also, since avatars may receive increasing content level as they move closer to the designated focal point object 125, proximity-based transmission of information may encourage avatars to return to the relevant location. In other examples, coordinators for virtual universe events (e.g., music concerts) may lease the virtual universe transmitters to broadcast music or other multimedia content. It is noted, however, that virtual universe businesses, groups, or other entities may also have the option to buy the virtual universe transmitters.

Figure 1B:
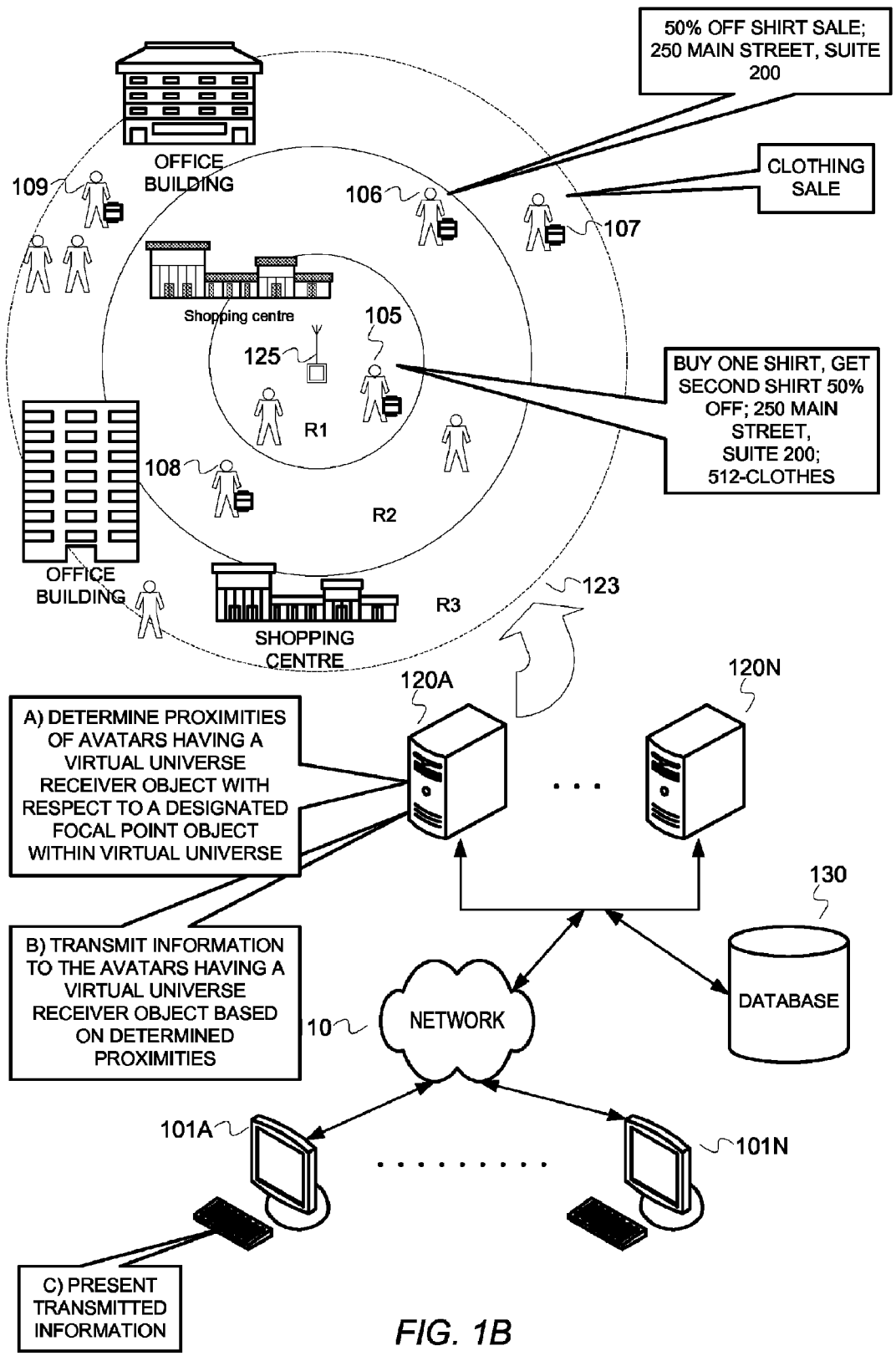
FIG. 1B conceptually depicts an example virtual universe system that transmits information to avatars having a virtual universe receiver object based on the proximities of the avatars with respect to a designated focal point object within the virtual universe.

FIG. 1B conceptually depicts an example virtual universe system that transmits information to avatars having a virtual universe receiver object based on the proximities of the avatars with respect to a designated focal point object within the virtual universe. At a stage A, virtual universe server 120A determines the proximities of the avatars having a virtual universe receiver object to a designated focal point object 125 within the virtual universe. In the example shown in FIG. 1B, each of the avatars 105-109 include a virtual universe receiver object. The virtual universe receiver objects can have the appearance of radios, televisions, cell phones, or other communication devices. Furthermore, the virtual universe receiver objects can be sold, leased or provided at no cost to avatars within the virtual universe. For example, the virtual universe administrator may offer avatars of the virtual universe an option to register free of charge (or for a monthly fee) to a service that will provide the avatars with proximity-based information. At stage B, virtual universe server 120A transmits information to the avatars having a virtual universe receiver object based on the determined proximities. At a stage C, the transmitted advertisement information is presented, e.g., to the user controlling avatar 105 at the client 101A.

It is noted that in some implementations, the proximity-based information is transmitted to both avatars having a virtual universe receiver object and avatars that do not have a virtual universe receiver object. However, in these implementations, only the avatars having a virtual universe receiver object may be able to interpret and process the transmitted information.

Figure 2:
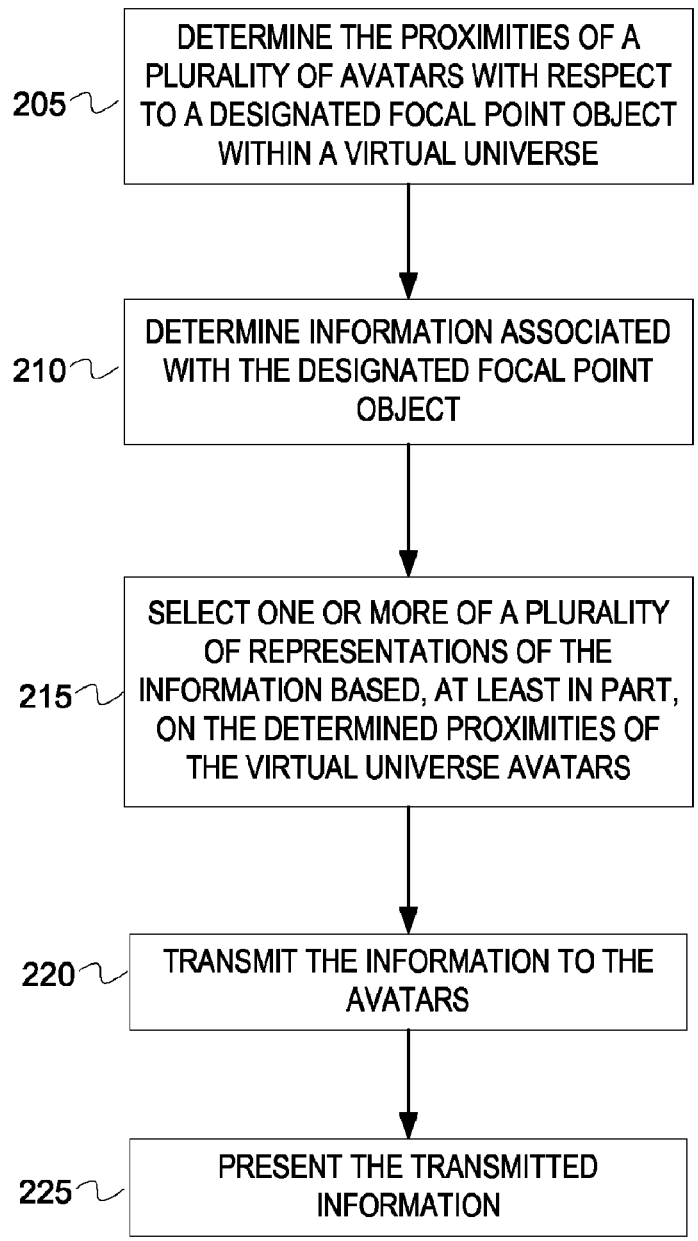
FIG. 2 is a flow diagram of example operations for transmitting information to avatars based on the proximities of the avatars with respect to a designated focal point object within the virtual universe.

FIG. 2 is a flow diagram of example operations for transmitting information to avatars based on the proximities of the avatars with respect to a designated focal point object within the virtual universe. At block 205, the proximities of a plurality of avatars with respect to a designated focal point object 125 within the virtual universe are determined. For instance, in the example shown in FIG. 1A, virtual universe server 120A detects that avatar 105 is X virtual feet (e.g., 35 virtual feet), avatar 106 is Y virtual feet (e.g., 90 virtual feet), and avatar 107 is Z virtual feet (e.g., 130 virtual feet), away from the designated focal point object 125. It is noted that the virtual universe server 120A can also detect the proximities of the rest of the avatars shown in FIG. 1A; however, this description will focus on the proximity-based communications to avatars 105-107.

At block 210, information associated with the designated focal point object 125 is determined. For instance, virtual universe server 120A determines what information is scheduled to be transmitted to the avatars, e.g., at a current time slot. In the example shown in FIG. 1A, an advertisement for a virtual universe clothing store may be scheduled to run during a current time slot or for the entire day. The owner(s) of the virtual universe clothing store may own their own virtual universe transmitter, or may lease one or more time slots of a virtual universe transmitter owned by another entity, e.g., the virtual universe administrator or the owner(s) of the virtual universe shopping center.

In some implementations, after determining the information associated with the designated focal point object 125, a first subset of the information can be selected for transmission to certain avatars, and a second subset of the information can be selected for transmission to other avatars. For example, the information associated with the designated focal point object 125 may include an advertisement for a virtual universe clothing store, an advertisement for a virtual universe car dealership, and an audio stream of the current top 40 songs. In this example, all three transmissions may be selected for certain avatars, and a subset of the transmissions (e.g., the car dealership ad and the audio stream, or only the audio stream) may be selected for other avatars. For each avatar, the selection of the information can be based on preference data associated with the avatar, e.g., preference information associated with the profile of the avatar and/or preference information associated with a membership type.

At block 215, one or more of a plurality of representations of the information are selected based, at least in part, on the determined proximities of the virtual universe avatars with respect to the designated focal point object 125. In various implementations, the plurality of representations of the information comprise a hierarchy of representations of the information, where the hierarchy corresponds to a plurality of proximities with respect to the designated focal point object 125. For instance, in some examples, the virtual universe server 120A may determine the content level (e.g., amount of content) and/or content type (e.g., text, audio, and/or video content) associated with the transmission of the information based on the detected proximities. It is noted that a representation of the information can comprise a portion of the information available for transmission, or all of the information available for transmission. For example, a first representation of the information can comprise a first portion of a document, a second representation of the information can comprise a second portion of the document, and a third representation of the information can comprise all of the document. It is further noted that a representation of the information can comprise a portion of the information or all of the information in one or more formats, e.g., in text, audio, and/or video format.

At block 220, the information is transmitted to the avatars of the virtual universe. In other words, the one or more selected representations of the information are transmitted to the corresponding avatars. In the example shown in FIG. 1A, the content level of the advertisement is determined based on whether the avatars are located within area R1, area R2, or area R3. As illustrated, in this example, avatar 105 is located within area R1, avatar 106 is located within area R2, and avatar 107 is located within area R3. Avatars within area R1, e.g., within 50 virtual feet of the designated focal point object 125, receive the full advertisement ("Buy One Shirt, Get Second Shirt 50% off") including address ("250 Main Street, Suite 200") and phone number ("914-CLOTHES"). Avatars within area R2, e.g., between 50 to 100 virtual feet of the designated focal point object 125, receive an abbreviated advertisement ("50% Off Shirt Sale") and the address. Avatars within area R3, e.g., between 100 to 150 virtual feet of the designated focal point object 125, receive a brief, generic advertisement ("Clothing Sale"). In one example, avatars located beyond area R3 do not receive the advertisement. It is noted, however, in some examples avatars within area R3 and beyond, i.e., avatars that are greater than 100 virtual feet from the designated focal point object 125, receive the brief, generic advertisement.

The content type associated with the transmission may also vary based on the detected proximities. For example, avatar 105 and all the other avatars within area R1 may receive audio and video content (e.g., video clip of the products that are on sale), whereas the avatars in areas R2 and R3 may only receive text. In other examples, avatars within areas R1 and R2 may be offered coupons or other special offers that expire unless the avatar responds within a predetermined amount of time (e.g., 10 minutes). For instance, a virtual car dealership may offer discounts on selected virtual universe vehicles.

At block 225, the transmitted information is presented to the users controlling the avatars. For example, the information may be generated next an avatar on a user's display or the information may be presented on a pop-up window. In some cases, the users controlling the avatars may be given the option to respond to the presented information. For example, the user may receive a special offer for a product that expires within a predetermined amount of time. In this example, the user may be given the option to accept or decline the offer, and if the user accepts the offer, the user may be prompted to enter some form of identification information.

Figure 3:
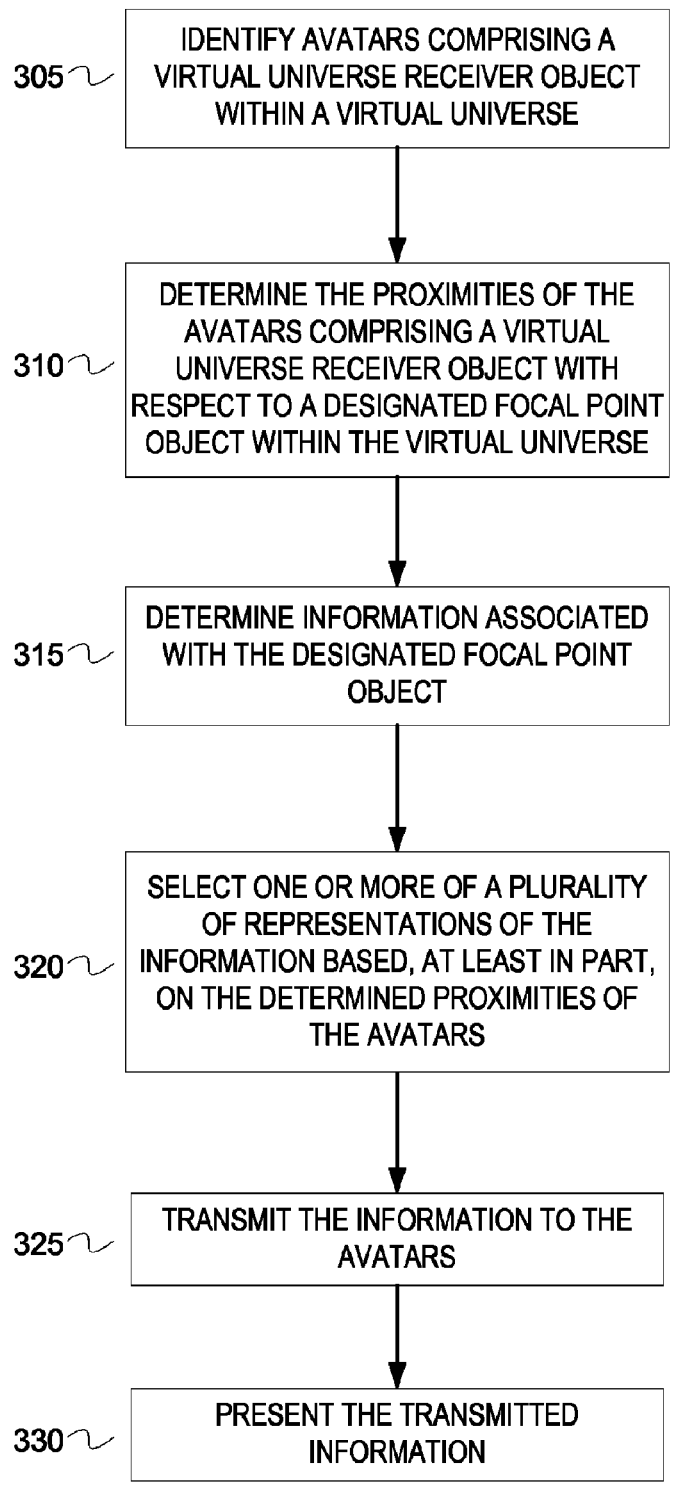
FIG. 3 is a flow diagram of example operations for transmitting information to avatars having a virtual universe receiver object based on the proximities of the avatars with respect to a designated focal point object within the virtual universe.

FIG. 3 is a flow diagram of example operations for transmitting information to avatars having a virtual universe receiver object based on the proximities of the avatars with respect to a designated focal point object within the virtual universe. At block 305, avatars having a virtual universe receiver object are identified within the virtual universe. For example, in the example shown in FIG. 1B, virtual universe server 120A determines that avatars 105-109 include a virtual universe receiver object. In various implementations, software may be embedded in the virtual universe receiver object and/or the corresponding avatar for interpreting and processing the transmitted information. At block 310, the proximities of the avatars having a virtual universe receiver object with respect to a designated focal point object 125 within the virtual universe are determined. For example, virtual universe server 120A detects that avatar 105 is 35 virtual feet, avatar 106 is 90 virtual feet, avatar 107 is 130 virtual feet, avatar 108 is virtual 75 feet, and avatar 109 is virtual 125 feet, away from the designated focal point object 125.

At block 315, information associated with the designated focal point object 125 is determined. At block 320, one or more of a plurality of representations of the information are selected based, at least in part, on the determined proximities of the avatars with respect to the designated focal point object 125. For example, the virtual universe server 120A may determine the content level and/or content type associated with the transmission of the information based on the detected proximities. At block 325, the information is transmitted to the avatars having a virtual universe receiver object within the virtual universe. For example, in the example shown in FIG. 1B, avatars 105-109 receive the advertisement from the virtual universe business. At block 330, the transmitted information is presented to the users controlling the avatars.

It is noted, however, that in some implementations, the proximity-based information is transmitted to all of the avatars within the virtual universe, or to all the avatars located within a predetermined proximity from the designated focal point object 125. In these implementations, although the information is transmitted to all the avatars, only avatars having a virtual universe receiver object may be able to interpret and process the transmitted information (e.g., using embedded software associated with the proximity-based service). It is further noted that, in some instances, the virtual universe administrator may provide limited access (e.g., a "sneak peak" preview or one-day trials) to the proximity-based service to avatars that do not have a virtual universe receiver object to encourage the avatars to obtain receivers, and/or may send messages to the avatars offering the avatars a virtual universe receiver for a monthly fee or at no cost.

In some examples, the virtual administrator may also offer optional services to avatars, for example, music and/or video streaming services. A fee may be required for the optional services. Alternatively, the optional services may be supported by advertisements, and therefore can be provided at no cost to the users controlling the avatars as long as the users subscribe to the service.

Figure 4:
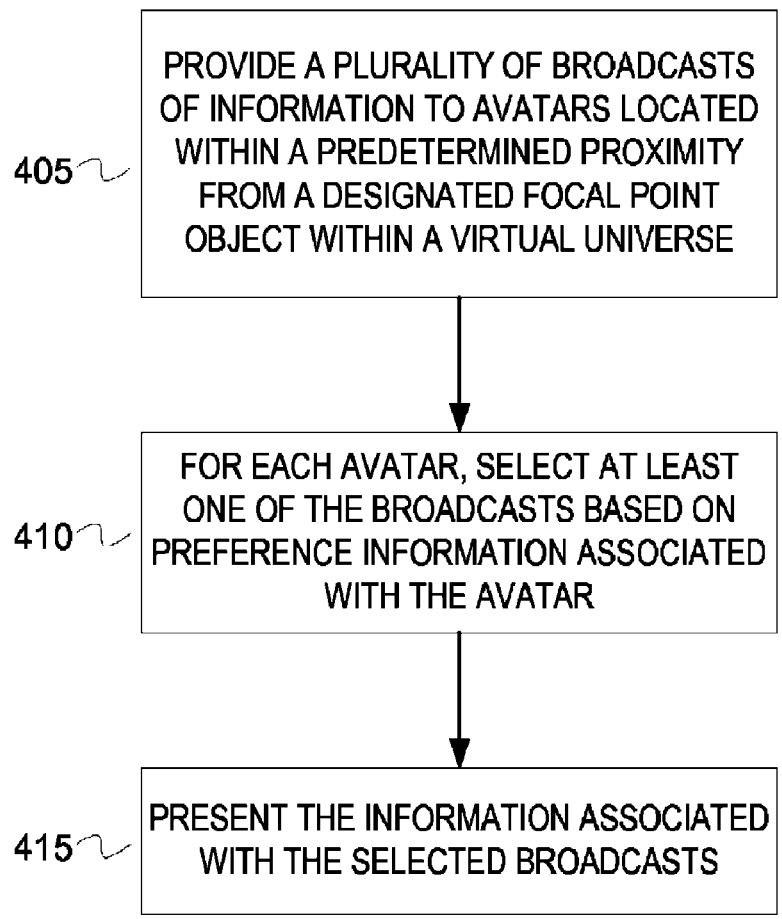
FIG. 4 is a flow diagram of example operations for selecting one or more of a plurality of broadcasts of information to avatars within the virtual universe.

FIG. 4 is a flow diagram of example operations for selecting one or more of a plurality of broadcasts of information to avatars within a virtual universe. At block 405, a plurality of broadcasts of information are provided to avatars located within a predetermined proximity from a designated focal point object 125 within the virtual universe. For instance, in the example shown in FIG. 1B, the broadcasts may be provided to avatars within areas R1, R2, and R3 (e.g., avatars within a working radius of 150 virtual feet from the designated focal point object 125). The plurality of broadcasts may be transmitted via a single virtual universe transmitter or a plurality of virtual universe transmitters. The content associated with each of the broadcasts may be selected by various techniques, e.g., the proximity-based techniques described above.

At block 410, for each avatar, at least one of the broadcasts is selected based on preference information associated with the avatar. In some implementations, avatars may obtain a virtual universe receiver object to interpret and process the broadcasted information. In these implementations, for each avatar that includes a virtual universe receiver object, at least one of the broadcasts is selected based on preference information received from a user controlling the avatar. In one example, after providing the broadcasts to an avatar, a preview or an indication of the available broadcasts may be presented to the avatar. In this example, the user controlling the avatar may select one or more of the broadcasts and send the preference information to the virtual universe server for selection of the desired broadcasts. In another example, at least one of the broadcasts is selected based on preference information associated with a virtual universe account associated with the avatar (e.g., profile, membership type, historical information, etc.). In this example, one or more broadcasts may be automatically selected after accessing the virtual universe account and reading the preference information. It is noted, however, that in some cases the broadcasts may be selected based on both preference information submitted by the user and preference information read from the virtual universe account associated with the avatar. At block 415, for each avatar, the information associated with the selected broadcast(s) is presented to the user controlling the avatar. The user controlling the avatar may subsequently switch between different broadcasts or select additional broadcasts by providing preference information to the virtual universe server.

It is further noted that in some implementations, rather than providing the broadcasts of information to the avatars, a preview or an indication of the available broadcasts is first provided to the avatars. In response to receiving an indication of the available broadcasts, the user controlling the avatar may provide preference information to the virtual universe server for selection of one or more broadcasts. After selection, the one or more selected broadcasts can be provided to the avatar. In other implementations, the avatar may initiate communications with a virtual universe transmitter, e.g., requesting that the virtual universe transmitter provide the avatar all the available broadcasts (or a preview of the broadcasts).

In some implementations, the plurality of broadcasts of information are provided to the avatars via a plurality of virtual universe channels. In these implementations, avatars may obtain a multi-channel virtual universe receiver object for selecting one or more virtual universe channels and for switching between channels.

Figure 5:
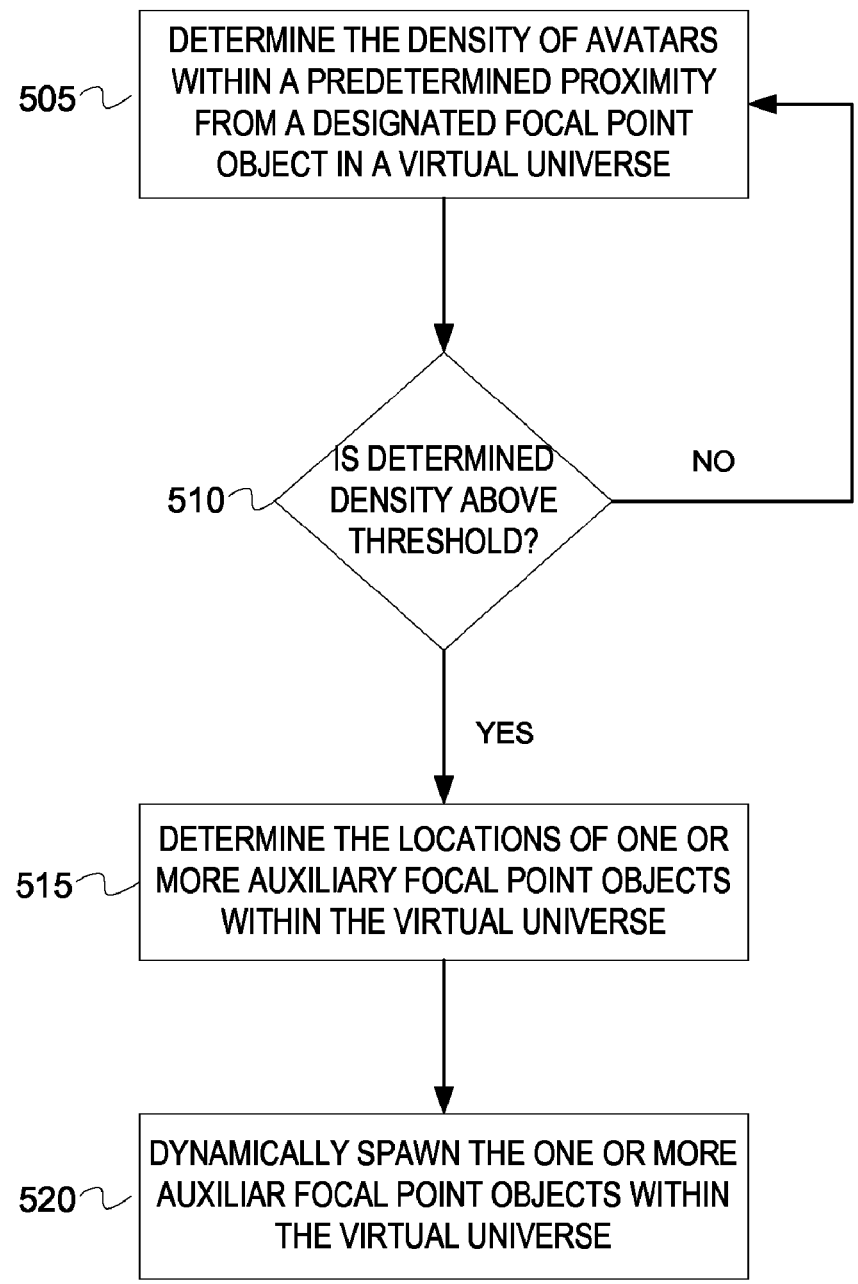
FIG. 5 is a flow diagram of example operations for dynamically spawning auxiliary focal point objects within the virtual universe.
Figure 6A:
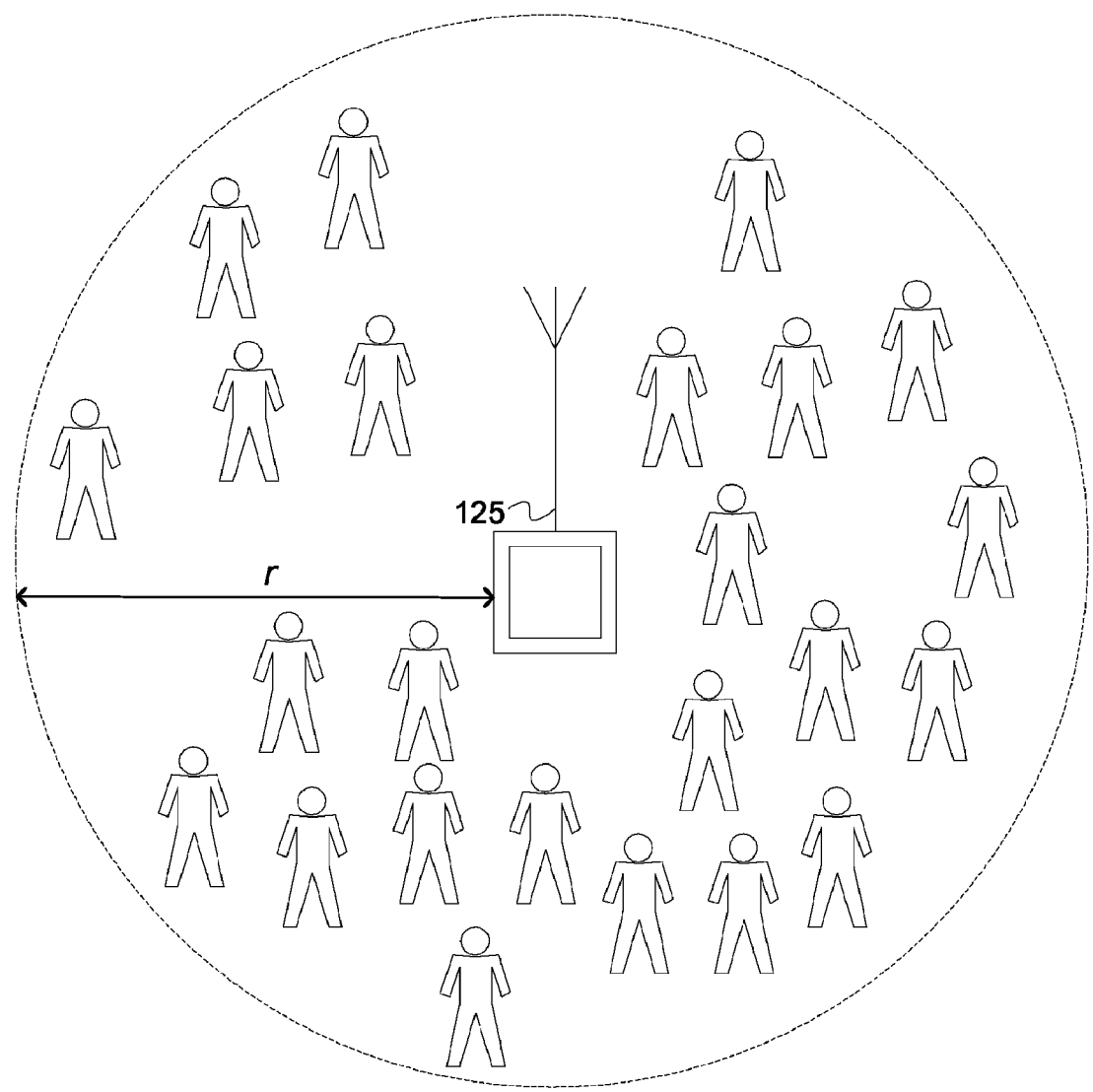
FIGS. 6A-6B conceptually depict an example of dynamic spawning auxiliary focal point objects within the virtual universe.

FIG. 5 is a flow diagram of example operations for dynamically spawning auxiliary focal point objects within a virtual universe. At block 505, the density of avatars within a predetermined proximity from a designated focal point object in the virtual universe is determined. For instance, in the example shown in FIG. 6A, the density of the avatars within a predetermined virtual distance r (e.g., 20 virtual feet) from the designated focal point object 125 located in region 1 is detected. The density may be defined as the number of avatars in a given virtual universe area. For example, in the example shown in FIG. 6A, when r equals 20 virtual feet, the density is equal to 24 avatars in a virtual universe area of 1256.64 virtual square feet.

At block 510, it is determined whether the density of the avatars is above a predetermined density threshold level. In one specific example, the predetermined density threshold may be 10 avatars in a virtual universe area of 1256.64 virtual square feet. The predetermined density threshold level may be determined based on the number of avatars that will likely cause an overload condition on the virtual universe host server, e.g., due, at least in part, to a large demand for computing resources at the server. The density threshold may be set at a level that can prevent overload conditions, which can impact the performance of the virtual universe and therefore user satisfaction. For example, if 12 avatars within a certain virtual universe area will likely cause an overload condition, the density threshold level may set at 10 avatars within that area.

Figure 6B:
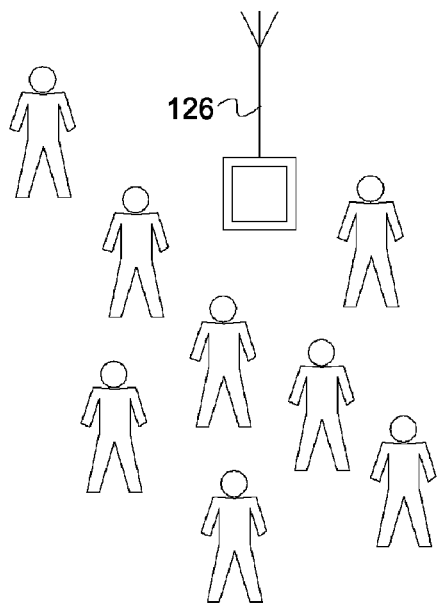
Figure 6B:
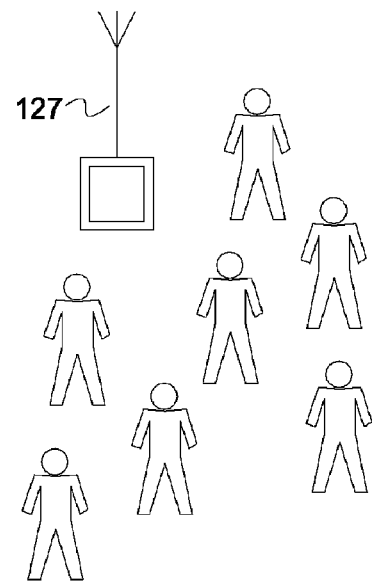
Figure 6B:
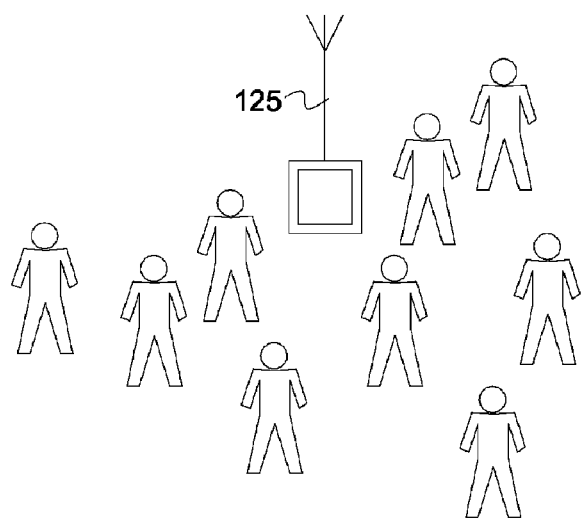

In some implementations, multiple density threshold levels can be set to determine how many auxiliary focal point objects to dynamically spawn. For instance, one auxiliary focal point object may be dynamically spawned for every threshold that is exceeded. In the example shown in FIGS. 6A and 6B, a first density threshold level may be 10 avatars within the virtual universe area with radius r, and a second density threshold may be 20 avatars within the same virtual universe area. In this example, since 24 avatars are within the virtual universe area with radius r, two auxiliary focal point objects will be dynamically spawned.

At block 515, if the detected density of the avatars is above the predetermined density threshold, the location(s) of the one or more auxiliary focal point objects within the virtual universe are determined. In one example, the locations for the auxiliary focal point objects can be determined by a load balancing algorithm, which, for example, examines the server capabilities (e.g., CPU, memory, bandwidth, etc.) of various virtual universe servers. In another example, an on-the-fly bidding process may be used to determine the locations, e.g., an island owner receives a signal that a new auxiliary focal point is predicted to be needed within 5 minutes, and the owner bids $10 to have the auxiliary focal point on his island. In other examples, historical information of past placements of auxiliary focal point objects may be analyzed, e.g., search for examples of past placements that that were effective in performing virtual universe load balancing. Also, predicted migration patterns of avatars and avatar population data may be used for determining effective locations for the placement of the auxiliary focal point objects.

At block 520, the one or more auxiliary focal point objects are dynamically spawned within the virtual universe. For instance, in the example shown in FIGS. 6A and 6B, a first auxiliary focal point object 126 is dynamically spawned in region 2 and a second auxiliary focal point object 127 is dynamically spawned in region 3. Dynamic spawning of auxiliary focal point objects reduces the load on the virtual universe host server, and on the client device(s) that is rendering the avatars, and thus improves performance of the virtual universe system. Auxiliary focal point objects also extend the transmission range of information, and therefore can bring additional benefits to the owner of the designated focal point object and to the businesses and other entities transmitting information (e.g., advertisements). In some implementations, the same or similar information that is transmitted to avatars near the designated focal point object is transmitted to avatars near the auxiliary focal point objects. In other implementations, different information is transmitted to avatars near the auxiliary focal point objects, e.g., depending on the location of the auxiliary focal point objects.

In various embodiments, to reduce the density of avatars around the designated focal point object 125, the virtual universe server can send requests to a subset of the avatars requesting that the avatars relocate (e.g., teleport) to the area near one of the auxiliary focal point objects. In some cases, the requests may be accompanied by offers of goods and services to encourage avatars to relocate. In other cases, messages sent to the avatars may require that the avatars relocate or risk being removed from the region, or the avatars may be automatically teleported to another area having one of the auxiliary focal point objects. It is noted, however, that in some implementations, relocation requests may not be sent to avatars, because the mere addition of auxiliary focal point objects can effectively implement a load balancing function as new user-controlled avatars are attracted to a transmission or the focal point of a transmission. It is further noted, that in other implementations, preference data associated with the avatars may be read to determine which avatars to teleport to an area having an auxiliary focal point object. In one example, preference data may be obtained from the profiles of the avatars, based on the membership type of the avatars, etc.

The dynamic spawning of auxiliary focal point objects may be made permanent according to various criteria, such as whether the benefits outweigh the cost of the maintaining the auxiliary focal point object. In one example, an auxiliary focal point object may be made permanent if the owner of the focal point object (e.g., the virtual universe administrator or a virtual universe business) determines that the location is useful in reaching a significant number of avatars and/or attracting sales.

In various other implementations, the dynamic spawning of one or more auxiliary focal point objects within the virtual universe can be based on one or more determined loading conditions (e.g., bandwidth, memory, CPU, power, etc.) on the virtual universe host server, in addition to the detected density of the avatars within a predetermined proximity from the designated focal point object. For example, one or more auxiliary focal point objects may be dynamically spawned within the virtual universe if the detected density of the virtual universe avatars is greater than a predetermined density threshold and the determined one or more loading conditions on the virtual universe host server are greater than one or more predetermined overload thresholds.

It should be understood that the depicted flow diagrams are examples meant to aid in understanding embodiments and should not be used to limit embodiments or limit scope of the claims. Embodiments may perform additional operations, fewer operations, operations in a different order, operations in parallel, and some operations differently. For instance, referring to FIGS. 1A-4, in various implementations, for cases where the transmission range is limited, owners of the virtual universe transmitters (e.g., designated focal point object 125) can purchase a virtual power booster to increase the virtual range of the virtual universe transmitter. For instance, with reference to the examples shown in FIGS. 1A and 1B, the virtual range of the virtual universe transmitter can be increased to reach an additional area R4, e.g., an area that may be 150 to 200 virtual feet away from the designated focal point object 125. In other implementations, owners of virtual universe transmitters can vary the transmission range up to a certain limit without the need to purchase virtual power boosters. Furthermore, in some implementations, a first of a plurality of magnitudes for a representation of information is determining based, at least in part, on a determined proximity of an avatar with respect to the designated focal point object 125. After determining the first magnitude, the representation of the information is transmitted to the virtual universe avatar at the determined first magnitude. For instance, in some examples, the magnitude associated with the representation of information increases as the avatar moves closer to the designated focal point object 125, e.g., text is displayed in bold or larger font, the volume of audio is increased, etc., and the magnitude decreases as the avatar moves away from the designated focal point object 125.

Embodiments may take the form of an entirely hardware embodiment, a software embodiment (including firmware, resident software, micro-code, etc.), or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing ("machine-readable storage medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
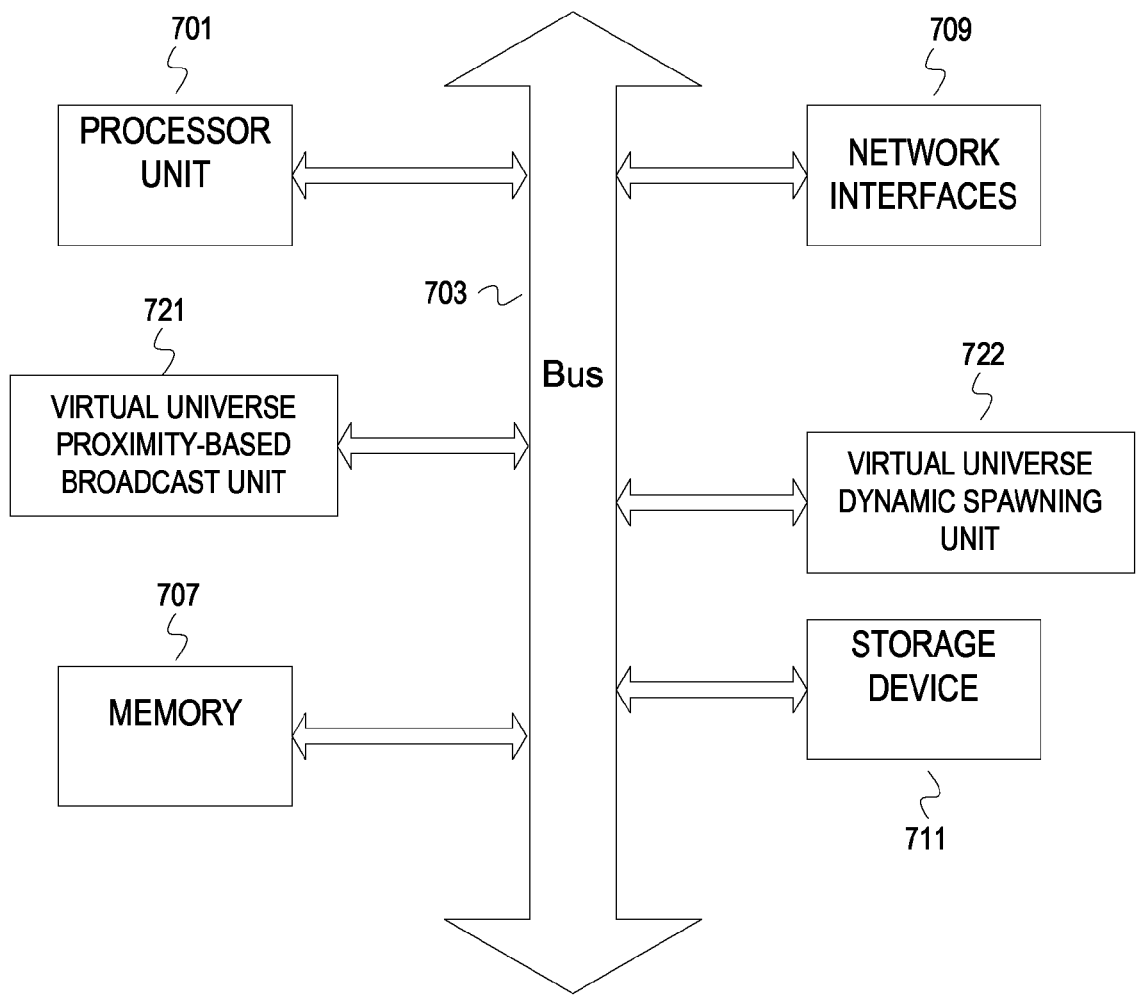
FIG. 7 depicts an example computer system.

FIG. 7 depicts an example computer system. A computer system includes a processor unit 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport®, InfiniBand®, NuBus, etc.), a network interface 705 (e.g., an ATM interface, an Ethernet interface, a Frame Relay interface, SONET interface, wireless interface, etc.), and a storage device(s) 709 (e.g., optical storage, magnetic storage, etc.). The computer system can include a virtual universe proximity-based broadcast unit 721 to implement embodiments described above. The virtual universe proximity-based broadcast unit 721 includes one or more functionalities that facilitate proximity-based transmissions within the virtual universe. The computer system may further include a virtual universe dynamic spawning unit 722 to implement embodiments described above. The virtual universe dynamic spawning unit 722 includes one or more functionalities that facilitate dynamic spawning of auxiliary focal point objects within the virtual universe. Any one of these functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701, the storage device(s) 709, and the network interface 705 are coupled to the bus 703. Although illustrated as being coupled to the bus 703, the memory 707 may be coupled to the processor unit 701.

While the embodiments are described with reference to various implementations and exploitations, it will be understood that these embodiments are illustrative and that the scope of the inventive subject matter is not limited to them. In general, techniques for proximity-based transmissions and/or dynamic spawning of auxiliary focal point objects within the virtual universe environment as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    a computer determining a density of virtual universe avatars within a predetermined proximity from a designated focal point object in a virtual universe, wherein the designated focal point object is associated with transmissions of information within the virtual universe; and
    the computer dynamically spawning a first auxiliary focal point object at a first virtual universe location within the virtual universe in response to the computer determining that the density of the virtual universe avatars within the predetermined proximity from the designated focal point object is greater than a first predetermined density threshold, wherein the first auxiliary focal point object is associated with the designated focal point object.

2. The method of claim 1, wherein the computer dynamically spawning the first auxiliary focal point object at the first virtual universe location within the virtual universe comprises the computer dynamically spawning the first auxiliary focal point object at the virtual universe location in the virtual universe that is different than a location of the designated focal point object in the virtual universe.

3. The method of claim 1, further comprising the computer dynamically spawning a second auxiliary focal point object at a second virtual universe location within the virtual universe in response to the computer determining that the density of the virtual universe avatars within the predetermined proximity from the designated focal point object is greater than a second predetermined density threshold, wherein the second predetermined density threshold is greater than the first predetermined density threshold.

4. The method of claim 1, further comprising the computer determining the first virtual universe location of the first auxiliary focal point object within the virtual universe.

5. The method of claim 1, further comprising the computer determining the first virtual universe location of the first auxiliary focal point object within the virtual universe based on at least one of load balancing between virtual universe servers, on-the-fly bidding, historical analysis of past placement of auxiliary focal point objects, and predicted migration patterns of the virtual universe avatars.

6. The method of claim 1, further comprising the computer notifying at least a subset of the virtual universe avatars within a predetermined proximity from the designated focal point object of at least one virtual universe location having a dynamically spawned auxiliary focal point object.

7. The method of claim 1, further comprising the computer transmitting requests to at least a subset of the virtual universe avatars within a predetermined proximity from the designated focal point object requesting that the at least a subset of the virtual universe avatars relocate to a virtual universe location having a dynamically spawned auxiliary focal point object.

8. The method of claim 1, further comprising:
    the computer reading preference data associated with profiles of the virtual universe avatars within a predetermined proximity from the designated focal point object; and
    the computer teleporting a subset of the virtual universe avatars to a virtual universe location having a dynamically spawned auxiliary focal point object based on the preference data associated with profiles of the virtual universe avatars.

9. The method of claim 1, further comprising:
    the computer transmitting information to a first plurality of virtual universe avatars located within the predetermined proximity from the designated focal point object of the virtual universe; and
    the computer transmitting the information to a second plurality of virtual universe avatars located within a predetermined proximity from a dynamically spawned auxiliary focal point object associated with the designated focal point object.

10. The method of claim 9, wherein the information comprises at least one of news, music, an advertisement, multimedia, a video feed, financial information, and entertainment information.

11. A method comprising:
a computer determining a number of virtual universe avatars within a predetermined proximity from a designated focal point object in a virtual universe, wherein the designated focal point object is associated with transmissions of information within the virtual universe;
the computer determining one or more loading conditions on a virtual universe host server supporting the designated focal point object in the virtual universe; and
the computer dynamically spawning one or more auxiliary focal point objects within the virtual universe in response to the computer determining that the number of virtual universe avatars within the predetermined proximity from the designated focal point object is greater than a predetermined threshold and the determined one or more loading conditions on the virtual universe host server are greater than a predetermined overload threshold.

12. The method of claim 11, wherein the computer dynamically spawning one or more auxiliary focal point objects within the virtual universe comprises the computer dynamically spawning one or more auxiliary focal point objects at different virtual universe locations than the designated focal point object.

13. The method of claim 11, further comprising the computer determining a location of each of the one or more auxiliary focal point objects within the virtual universe based on at least one of load balancing between virtual universe servers, on-the-fly bidding, historical analysis of past placement of auxiliary focal point objects, and predicted migration patterns of virtual universe avatars.

14. The method of claim 11, further comprising:
the computer transmitting information to a first plurality of virtual universe avatars located within the predetermined proximity from the designated focal point object of the virtual universe; and
the computer transmitting the information to a second plurality of virtual universe avatars located within a predetermined proximity from a dynamically spawned auxiliary focal point object associated with the designated focal point object.

15. A computer program product for implementing dynamic spawning of one or more objects in a virtual universe, the computer program product comprising:
one or more computer-readable tangible storage devices;
program instructions, stored on at least one of the one or more storage devices, to determine a density of virtual universe avatars within a predetermined proximity from a designated focal point object in a virtual universe, wherein the designated focal point object is associated with transmissions of information within the virtual universe; and
program instructions, stored on at least one of the one or more storage devices, to dynamically spawn a first auxiliary focal point object at a first virtual universe location within the virtual universe in response to determining that the density of the virtual universe avatars within the predetermined proximity from the designated focal point object is greater than a first predetermined density threshold, wherein the first auxiliary focal point object is associated with the designated focal point object.

16. The computer program product of claim 15, further comprising program instructions, stored on at least one of the one or more storage devices, to determine the first virtual universe location of the first auxiliary focal point object within the virtual universe.

17. A computer system for implementing dynamic spawning of one or more objects in a virtual universe, the computer system comprising:
one or more processors, one or more computer-readable memories and one or more computer-readable tangible storage devices;
program instructions, stored on at least one of the one or more storage devices for execution by at least one of the one or more processors via at least one of the one or more memories, to determine a density of virtual universe avatars within a predetermined proximity from a designated focal point object in a virtual universe, wherein the designated focal point object is associated with transmissions of information within the virtual universe; and
program instructions, stored on at least one of the one or more storage devices for execution by at least one of the one or more processors via at least one of the one or more memories, to dynamically spawn a first auxiliary focal point object at a first virtual universe location within the virtual universe in response to determining that the density of the virtual universe avatars within the predetermined proximity from the designated focal point object is greater than a first predetermined density threshold, wherein the first auxiliary focal point object is associated with the designated focal point object.

18. The computer system of claim 17, further comprising:
program instructions, stored on at least one of the one or more storage devices for execution by at least one of the one or more processors via at least one of the one or more memories, to determine the first virtual universe location of the first auxiliary focal point object within the virtual universe.

* * * * *